(12) United States Patent
Zhang et al.

(10) Patent No.: US 12,452,864 B2
(45) Date of Patent: Oct. 21, 2025

(54) SYSTEMS AND METHODS FOR PDSCH BASED CSI MEASUREMENT

(71) Applicant: APPLE INC., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 201 days.

(21) Appl. No.: 18/476,530

(22) Filed: Sep. 28, 2023

(65) Prior Publication Data
US 2024/0057083 A1 Feb. 15, 2024

Related U.S. Application Data

(63) Continuation of application No. 17/593,390, filed as application No. PCT/CN2021/115255 on Aug. 30, 2021, now Pat. No. 11,985,661.

(51) Int. Cl.
*H04B 7/06* (2006.01)
*H04L 5/00* (2006.01)
(Continued)

(52) U.S. Cl.
CPC ...... *H04W 72/1273* (2013.01); *H04B 7/0626* (2013.01); *H04L 5/0012* (2013.01);
(Continued)

(58) Field of Classification Search
CPC ... H04B 7/0626; H04L 5/0012; H04L 5/0057; H04W 72/1273; H04W 72/232
See application file for complete search history.

(56) References Cited

U.S. PATENT DOCUMENTS 9,271,283 B2 * 2/2016 You .................. H04L 5/001
9,730,206 B2 * 8/2017 Fu .................... H04W 72/21
(Continued)

FOREIGN PATENT DOCUMENTS

CN 110999172 A 4/2020
WO 2021178788 A1 9/2021

OTHER PUBLICATIONS

NTT Docomo, Inc., "Views on CSI measurement for NR", R1-1716080, 3GPP TSG RAN WG1 Meeting NR#3, Nagoya, Japan, Agenda Item 6.2.2.1, Sep. 18-21, 2017, 19 pages.
(Continued)

*Primary Examiner* — Alpus Hsu
(74) *Attorney, Agent, or Firm* — Dorsey & Whitney LLP

(57) ABSTRACT

Systems and methods provide a channel state information (CSI) measurement based on measuring a demodulation reference signal (DMRS) for a physical downlink shared channel (PDSCH) transmission. A user equipment (UE) triggers measuring of a CSI reference signal (CSI-RS) from a base station. The UE triggers measuring of a DMRS for a PDSCH transmission from the base station. The UE generates a CSI report to report the CSI measurement, based on both the CSI-RS and the DMRS for the PDSCH transmission. The UE may then send the CSI report to report the CSI measurement to the base station.

20 Claims, 7 Drawing Sheets

(51) Int. Cl.
*H04W 72/12* (2023.01)
*H04W 72/1273* (2023.01)
*H04W 72/232* (2023.01)
*H04W 72/54* (2023.01)

(52) U.S. Cl.
CPC ......... *H04L 5/0051* (2013.01); *H04W 72/232* (2023.01); *H04W 72/54* (2023.01)

(56) References Cited

U.S. PATENT DOCUMENTS

| | | | |
|---|---|---|---|
| 9,936,486 | B2 | 4/2018 | You et al. |
| 10,164,748 | B2 * | 12/2018 | Li ..................... H04L 5/0048 |
| 10,231,144 | B2 * | 3/2019 | Guo ..................... H04L 1/0026 |
| 10,321,468 | B2 * | 6/2019 | Xu ..................... H04L 5/0053 |
| 10,834,716 | B2 | 11/2020 | Park et al. |
| 10,944,450 | B2 | 3/2021 | Park et al. |
| 2015/0373694 | A1 | 12/2015 | You et al. |
| 2016/0029238 | A1 * | 1/2016 | Chen ..................... H04W 76/27 370/252 |
| 2019/0215119 | A1 * | 7/2019 | Kim ..................... H04L 5/0094 |
| 2020/0028652 | A1 * | 1/2020 | Bai ..................... H04L 5/0053 |
| 2020/0036555 | A1 * | 1/2020 | Davydov ............... H04B 7/024 |
| 2020/0112355 | A1 | 4/2020 | Park et al. |
| 2020/0112357 | A1 | 4/2020 | Fakoorian et al. |
| 2020/0177255 | A1 | 6/2020 | Lee et al. |
| 2020/0229014 | A1 | 7/2020 | Nagata et al. |
| 2020/0313831 | A1 * | 10/2020 | Kim ..................... H04L 5/001 |
| 2021/0367727 | A1 | 11/2021 | Go et al. |
| 2022/0078810 | A1 | 3/2022 | Huang et al. |
| 2022/0124736 | A1 * | 4/2022 | Huang ................. H04W 72/23 |
| 2022/0247468 | A1 | 8/2022 | Huang et al. |
| 2022/0360306 | A1 * | 11/2022 | Sun ..................... H04L 1/0027 |
| 2023/0247631 | A1 * | 8/2023 | Hao ..................... H04L 1/1822 370/252 |
| 2023/0254086 | A1 * | 8/2023 | Hao ..................... H04L 5/0051 370/329 |

OTHER PUBLICATIONS

PCT/CN2021/115255, International Search Report and Written Opinion, May 25, 2022, 10 pages.
U.S. Appl. No. 17/593,390, Notice of Allowance, Feb. 15, 2024, 7 pages.
U.S. Appl. No. 17/593,390, Non-Final Office Action, Jan. 18, 2024, 6 pages.

* cited by examiner

SYSTEMS AND METHODS FOR PDSCH BASED CSI MEASUREMENT

TECHNICAL FIELD

This application relates generally to wireless communication systems, including channel state information (CSI) measurement and reporting.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
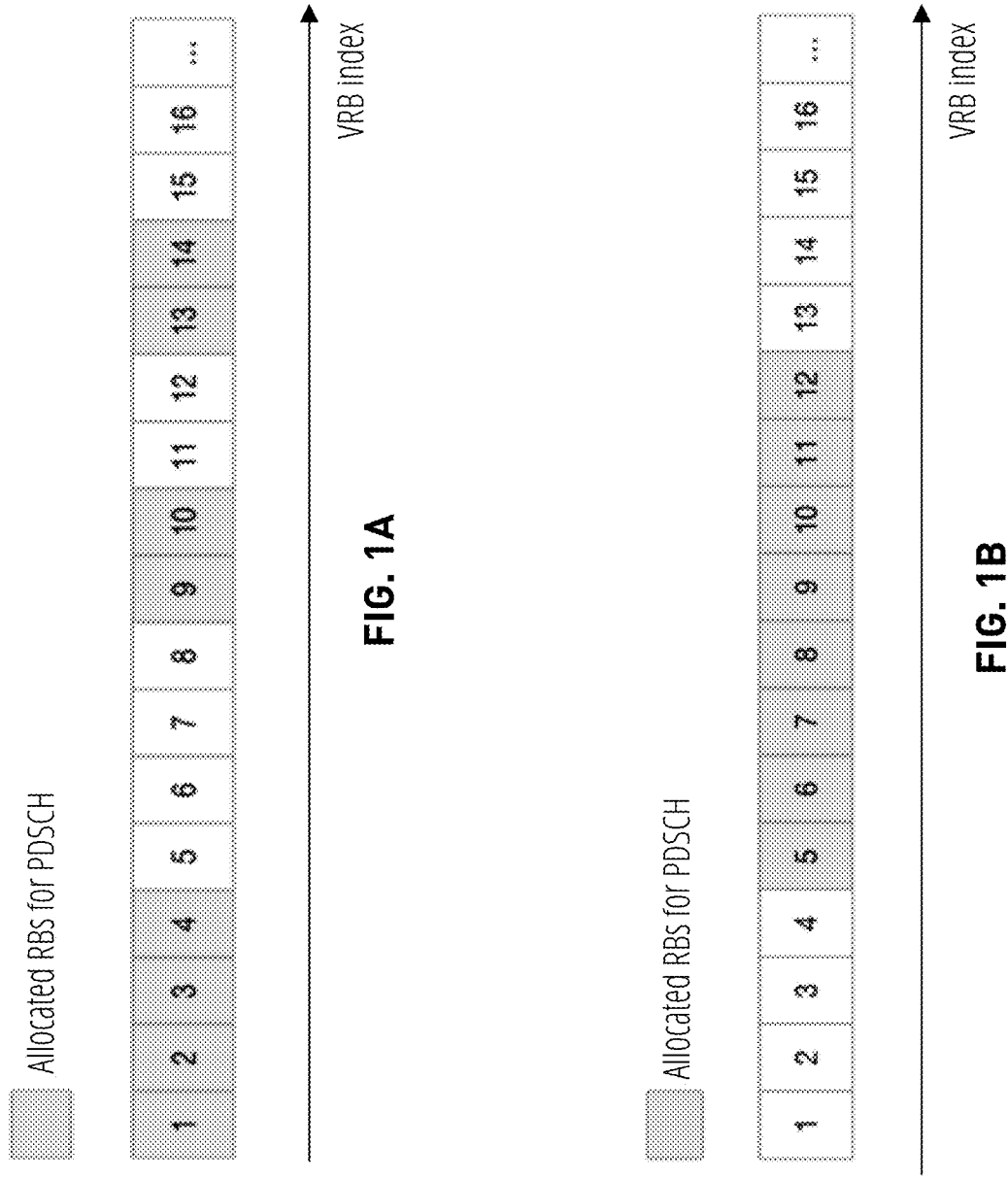
FIG. 1A illustrates an example of allocated resource blocks for PDSCH with respect to a VRB index for type 0 FDRA in accordance with one embodiment.
FIG. 1B illustrates an example of allocated resource blocks for PDSCH with respect to a VRB index for type 1 FDRA in accordance with one embodiment.

In certain wireless systems, two types of frequency domain resource allocation (FDRA) schemes type 0 and type 1) are supported for physical downlink shared channel (PDSCH). See, e.g., 3GPP Technical Specification (TS) 38.214, Section 5.1.2.2. In type 0 FDRA, the PDSCH can be transmitted in several resource block groups (RBGs), where each RBG includes a set of consecutive virtual resource blocks (VRB). The allocated RBGs can be either continuous or discontinuous. For example, FIG. 1A illustrates an example of allocated resource blocks (RBs) for PDSCH with respect to a VRB index for type 0 FDRA. In this example, the RBG size is two RBs. A bitmap in downlink control information (DCI) may be used to indicate the allocated RBG.

In type 1 FDRA, the PDSCH may be transmitted in consecutive VRBs. For example, FIG. 1B illustrates an example of allocated RBs for PDSCH with respect to a VRB index for type 1 FDRA. A resource indication value (RIV) may be used in DCI to indicate the starting VBRs and the number of allocated RBs.

For type 0 or type 1 FDRA, in certain systems, the allocated VRBs may be mapped to physical RBs (PRBs) based on an interleaved schemes where the interleaving is per PRB bundle.

In certain systems, CSI is measured based on a CSI reference signal (CSI-RS) and an interference measurement resource (IMR). The CSI-RS is used for channel measurement. The IMR is used for interference measurement, which can be CSI interference measurement (CSI-IM) and/or CSI-RS.

Generally, however, the CSI measured from CSI-RS cannot reflect the actual CSI status for a PDSCH transmission, especially an actual interference status based on a real receiver. Thus, the base station (e.g., gNB) introduces open-loop link adaptation (OLLA) schemes to compensate such gaps between the CSI measured from the CSI-RS and the actual CSI status based on the real receiver. For example, the base station may consider a hybrid automatic repeat request (HARQ) acknowledgement (ACK) or negative acknowledgement (NACK), or HARQ ACK/NACK, status reporting for OLLA compensation. If the UE consistently reports ACK, for example, the base station may use a higher modulation and coding scheme (MCS) to schedule the data transmission. However, if the UE consistently reports NACK, the base station may use a lower MCS. Thus, OLLA may use additional delay to converge because the base station needs to check the HARQ ACK/NACK status for multiple slots.

CSI may be measured based on a demodulation reference signal (DMRS) for the PDSCH. The PDSCH carries user data. References signals such as DMRS and a phase tracking reference signal are associate with the PDSCH. The DMRS is used for channel estimation as part of coherent demodulation of the PDSCH.

The resources allocated for PDSCH are within the bandwidth part (BWP) of the carrier. The resources in the time domain for PDSCH transmission may be scheduled by a time domain resource assignment field in the DCI, which indicates a slot offset K0, starting symbol S, allocation length L, and mapping type of the PDSCH.

The resources in the frequency domain for PDSCH transmission are scheduled by a frequency domain resource assignment field in the DCI, which indicates whether the resource allocation of RBs is contiguous or noncontiguous, based on the allocation type. The RBs allocated are within the BWP.

The DMRS is present in the RBs allocated for the PDSCH. The symbol allocation of PDSCH indicates the orthogonal frequency division (OFDM) symbol locations used by the PDSCH transmission in a slot. The DMRS symbol locations lie within the PDSCH symbol allocation. The maximum number of DMRS OFDM symbols used by a UE may be configured by radio resource control (RRC) signaling. For example, a maxLength RRC parameter configures the length of DMRS symbol, single symbol DMRS or double symbol DMRS. For double symbol DMRS, the actual selection may be signaled in the DCI format 1_1 message.

While CSI may be measured based on the DMRS for the PDSCH, there are issues that make such CSI measurements difficult. For example, sometimes the bandwidth for PDSCH is so small that it is hard to measure wideband CSI (e.g., for voice over internet protocol (VoIP) traffic). As another example, the PDSCH is transmitted based on a certain precoder, which makes it difficult to determine a rank indicator (RI) and/or a precoding matrix indicator (PMI) based on the DMRS for the PDSCH.

Thus, embodiments disclosed herein address the issues with using DMRS for PDSCH measurements of CSI. In certain embodiments, for example, PDSCH frequency hopping is used to support wideband CSI measurement. In addition, or in other embodiments, both CSI-RS measurements and DMRS for PDSCH measurements are used to determine the CSI.

A. PDSCH Frequency Hopping

In one embodiment, frequency hopping is used for PDSCH resource mapping. The frequency hopping may be enabled by higher layer signaling (e.g., DCI or RRC signaling). In one example, a flag to indicate frequency hopping may be used in DCI format 1_1 and/or DCI format 1_2 that is used to schedule PDSCH.

The UE constructs a wideband signal (or wider signal) for CSI measurement based on multiple hops. The frequency hopping may be applied in a VRB level or a PRB level. In certain embodiments, the UE can report to the base station whether it supports this feature.

Figure 2:
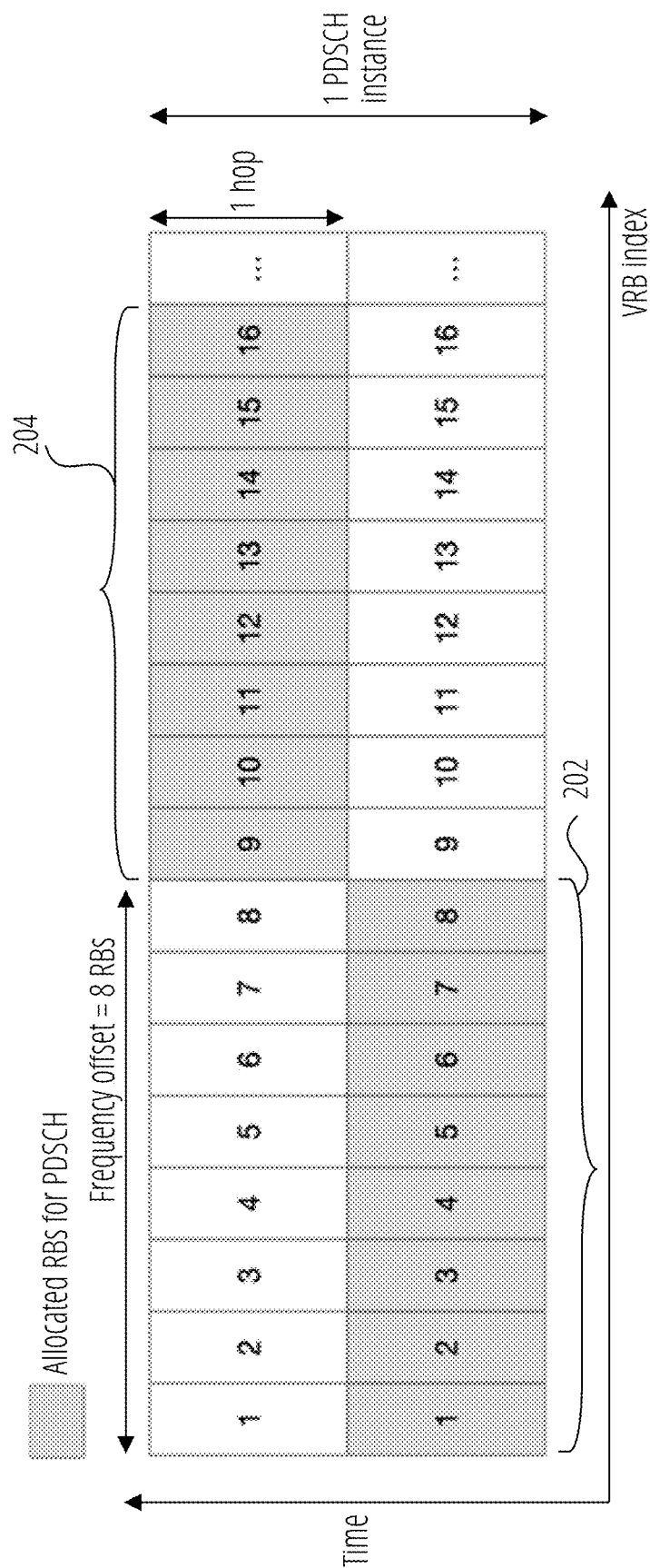
FIG. 2 illustrates frequency hopping for PDSCH resource mapping in accordance with one embodiment.

For example, FIG. 2 illustrates frequency hopping for PDSCH resource mapping according to one embodiment. This example shows two hops wherein at a first time a first subset 202 of RBs are allocated and at a second time a second subset 204 of RBs are allocated for a PDSCH instance.

1. Frequency Offset

In the example shown in FIG. 2, the frequency offset=8 RBs. The frequency offset for each hop may be configured by higher layer signaling (e.g., DCI or RRC signaling). The frequency offset may be defined in an RB level, which can be counted as the gap between the starting RBs for every two hops or the gap between the ending RB in the first hop and the starting RB in the second hop. Alternatively, for each hop, the frequency offset can be counted based on a reference hop, where the reference hop may be the first hop.

In one embodiment, the base station can configure a list of frequency hopping offsets by RRC signaling and a field in DCI can indicate one of the frequency hopping offsets from the list. In another embodiment, the frequency offset can be determined by the number of scheduled RBs (N_RB), the maximum number of RBs in the active bandwidth part (N_BWP), and/or the number of hops (N_h). In one example, frequency offset=N_RB+floor(N_BWP/N_h), where floor( ) is a floor function.

2. Number of Hops Indication

In one embodiment, the number of hops for a PDSCH transmission is configured by higher layer signaling (e.g. RRC signaling). In another embodiment, the number of hops for a PDSCH transmission is indicated by scheduling DCI (e.g., DCI format 1_1 and/or DCI format 1_2). In another embodiment, the number of hops is predefined (e.g., two hops). In another embodiment, the number of hops is determined by the number of PDSCH transmission occasions (e.g., four PDSCH repetitions). For example, the number of hops is the same as number of PDSCH transmission occasions.

In another embodiment, the number of hops for a PDSCH transmission is configured based on both signaling from the base station (e.g., RRC signaling or scheduling DCI) and the number of PDSCH transmission occasions. For example, RRC or DCI may indicate the number of hops per PDSCH transmission occasion and the total number of hops may equal the number of PDSCH transmission occasions times the number of hops per PDSCH transmission occasion.

In another embodiment, the maximum number of hops can be determined by the number of scheduled RBs (N_RB) and the total number of RBs in the active BWP (N_BWP). For example, the maximum number of hops=ceil(N_BWP/N_RB), where ceil( ) is a ceiling function.

3. DMRS Time Domain Indication

In one embodiment, the DMRS time domain location is indicated per hop. For example, a common DMRS time domain pattern is applied for each hop. In another embodiment, the DMRS time domain location is indicated per PDSCH transmission occasion. For example, the base station configures each hop to include DMRS symbols with the same number of DMRS ports.

In some embodiments, the frequency hopping may only be applicable for one type of FDRA (e.g. type 1 FDRA). In other embodiments, the frequency hopping is application for both types of FDRA (e.g., type 0 and type 1 FDRA).

For PDSCH with frequency hopping, in certain embodiments, the UE may use a consistent receive (Rx) beam to receive the hops.

4. Hopping Patterns

Figure 3A:
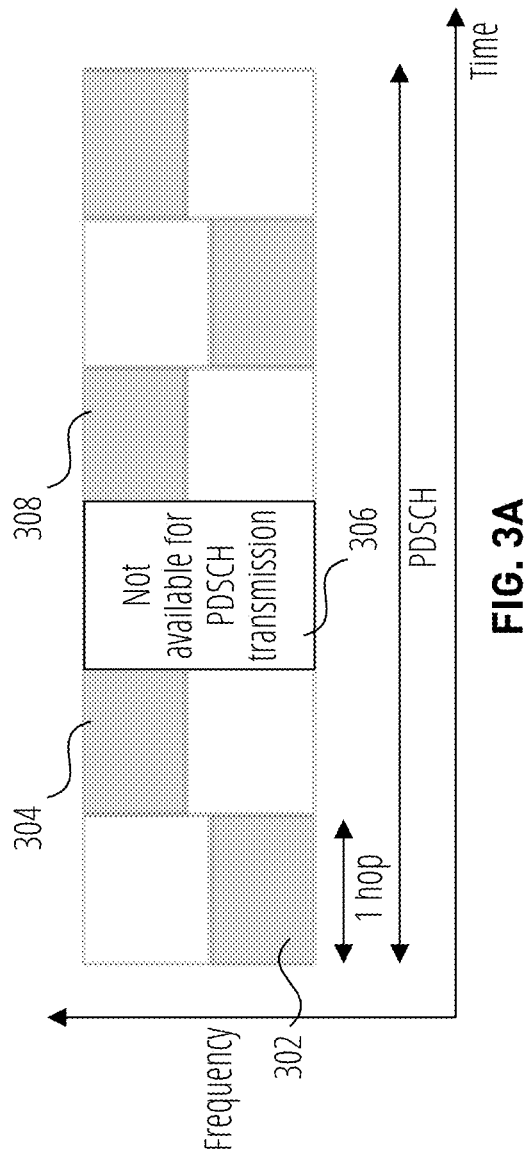
FIG. 3A illustrates a frequency hopping pattern based on nominal PDSCH transmission occasions in accordance with one embodiment.

In certain embodiments, the frequency hopping may be applied for each actual PDSCH transmission occasion or for all the nominal PDSCH transmission occasions. The nominal transmission occasions are based on a scheduling pattern. However, for each nominal transmission occasion there may not be an actual PDSCH transmission (e.g., because of a resource collision with an uplink signal or other downlink signals). For example, FIG. 3A illustrates a frequency hopping pattern based on nominal PDSCH transmission occasions according to one embodiment. In this example, the number of hops is two such that the pattern switches between a first frequency and a second frequency at each nominal transmission occasion. Thus, as shown, the pattern hops from the first frequency at a first nominal PDSCH transmission occasion 302 to the second frequency at a second nominal PDSCH transmission occasion 304. The pattern would then hop back to the first frequency at a third nominal PDSCH transmission occasion 306 then to the second frequency at a fourth nominal PDSCH transmission occasion 308, and so on. Even though the third nominal PDSCH transmission occasion 306 in this example is not available for PDSCH transmission, the pattern continues such that the second frequency is used for the fourth nominal PDSCH transmission occasion 308.

Figure 3B:
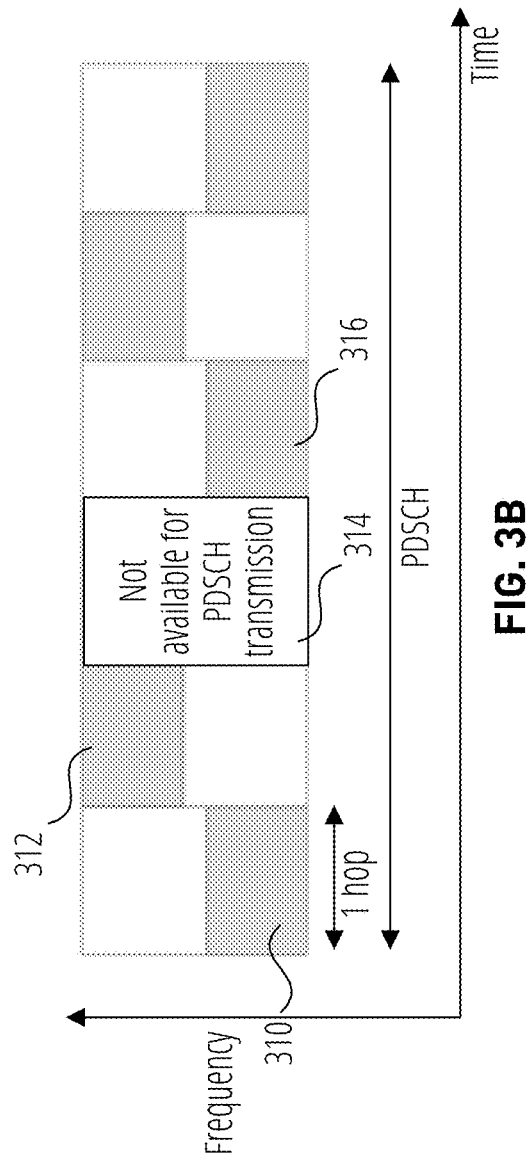
FIG. 3B illustrates a frequency hopping pattern based on actual PDSCH transmission occasions in accordance with one embodiment.

When the frequency hopping is applied for each actual PDSCH transmission occasion, resources that are not available for PDSCH transmission are not counted as part of the pattern. For example, FIG. 3B illustrates a frequency hopping pattern based on actual PDSCH transmission occasions according to one embodiment. In this example, the number of hops is two such that the pattern switches between a first frequency and a second frequency at each actual transmission occasion. Thus, as shown, the pattern hops from the first frequency at a first nominal PDSCH transmission occasion 310 to the second frequency at a second nominal PDSCH transmission occasion 312. Because the resources are not available for PDSCH transmission at a third nominal PDSCH transmission occasion 314, the pattern hops from the second frequency at the second nominal PDSCH transmission occasion 312 to the first frequency at a fourth nominal PDSCH transmission occasion 316.

In certain embodiments, if the number of PDSCH transmission occasions is above the number of hops, the same hopping pattern may be applied for the follow-up PDSCH transmission occasions.

B. Measuring CSI Based On CSI-RS+DMRS for PDSCH

In certain embodiments, the base station configures the UE to measure CSI based on both CSI-RS and DMRS for PDSCH.

1. Single DCI Trigger

In one such embodiment, the CSI and PDSCH are triggered by the same DCI. For example, a "CSI request" in the DCI may be introduced to trigger the aperiodic CSI-RS and a corresponding CSI report. The CSI may be reported by a physical uplink control channel (PUCCH) resource indicated by the DCI.

Figure 4A:
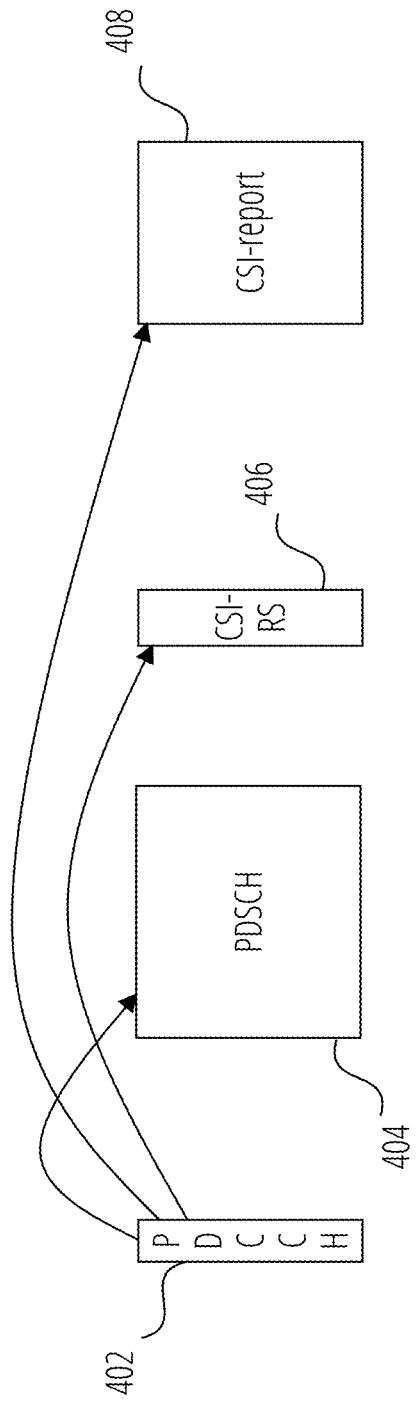
FIG. 4A illustrates a single PDCCH to trigger both CSI-RS and PDSCH measurement and reporting in accordance with one embodiment.

For example, FIG. 4A illustrates a single physical downlink control channel (PDCCH) to trigger both CSI-RS and PDSCH measurement and reporting. In the example shown in FIG. 4A, DCI is transmitted over a PDCCH 402. The DCI triggers measuring DMRS for a PDSCH 404 and measuring a CSI-RS 406. The DCI in the PDCCH 402 also triggers a CSI-report 408 to report the CSI measurement based on the DMRS for the PDSCH 404 and the CSI-RS 406.

2. Separate DCI Triggers

Figure 4B:
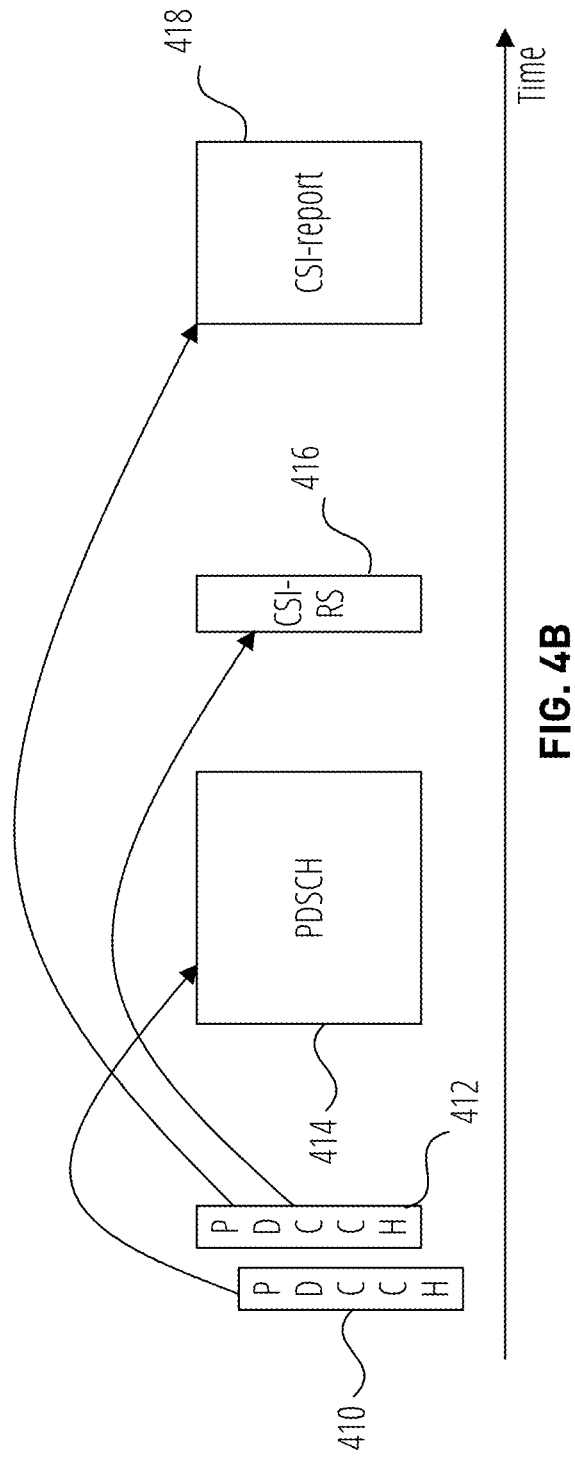
FIG. 4B illustrates separate PDCCHs to trigger CSI-RS and PDSCH measurement and reporting in accordance with one embodiment.

In another embodiment, the base station triggers the CSI and DMRS for PDSCH measurements by the separate DCIs. For example, FIG. 4B illustrates separate PDCCHs to trigger CSI-RS and PDSCH measurement and reporting. In the example shown in FIG. 4B, a first DCI is transmitted over a first PDCCH 410 and a second DCI is transmitted over a second PDCCH 412. The first DCI triggers measuring DMRS for a PDSCH 414. The second DCI triggers measuring a 416 and a corresponding CSI-report 418. The CSI-report 418 may include the CSI measured based on both the DMRS of the PDSCH 414 and the CSI-RS 416.

In one embodiment, one bit in the DCI of the first PDCCH 410 indicates whether the DMRS of the PDSCH 414 is used for CSI measurement.

In another embodiment, the PDSCH used for CSI measurement is determined by a preparation delay for the CSI-report 418. In one example, the PDSCH for CSI measurement is the most recent PDSCH at K slots before the CSI-report 418, where K indicates the minimal CSI processing delay. In another example, the PDSCH for CSI measurement is the most recent PDSCH that is based on the same quasi-colocation (QCL)-TypeD (Spatial Rx parameters) indication as the CSI-RS at K slots before the CSI-report 418, where K indicates the minimal CSI processing delay.

In certain embodiments, the minimal latency for a CSI-report (e.g., the CSI-report 408 or the CSI-report 418) is counted starting from the last symbol of the CSI-RS and PDSCH or DMRS for PDSCH.

3. CSI-RS for Channel Measurement and DMRS for PDSCH for Interference Measurement For CSI measurement based on both CSI-RS and DMRS for PDSCH, according to certain embodiments, the CSI-RS is used for channel measurement and DMRS for PDSCH is used for interference measurement.

In one embodiment, the base station indicates whether a time domain measurement restriction (TDMR) for PDSCH is enabled or not. If the TDMR is enabled, the UE measures the interference based on the latest PDSCH instance that meets the processing delay requirement. If the TDMR is disabled, the UE measures the interference based on the PDSCH instances that meet the processing delay requirement with interference averaging.

In one embodiment, in a CSI-report configuration (CSI-reportConfig), the base station indicates whether the CSI is measured based on PDSCH or not.

In certain embodiments, the base station may configure additional IMR resources (e.g., CSI-IM and/or CSI-RS). The additional IMR may be used for additional interference measurement (e.g. Multi-User Multiple-Input Multiple Output (MU-MIMO) interference measurement). Alternatively, the additional IMR may be used for interference measurement for CSI-RS that does not share the same QCL-TypeD indication as that of the PDSCH.

Figure 5:
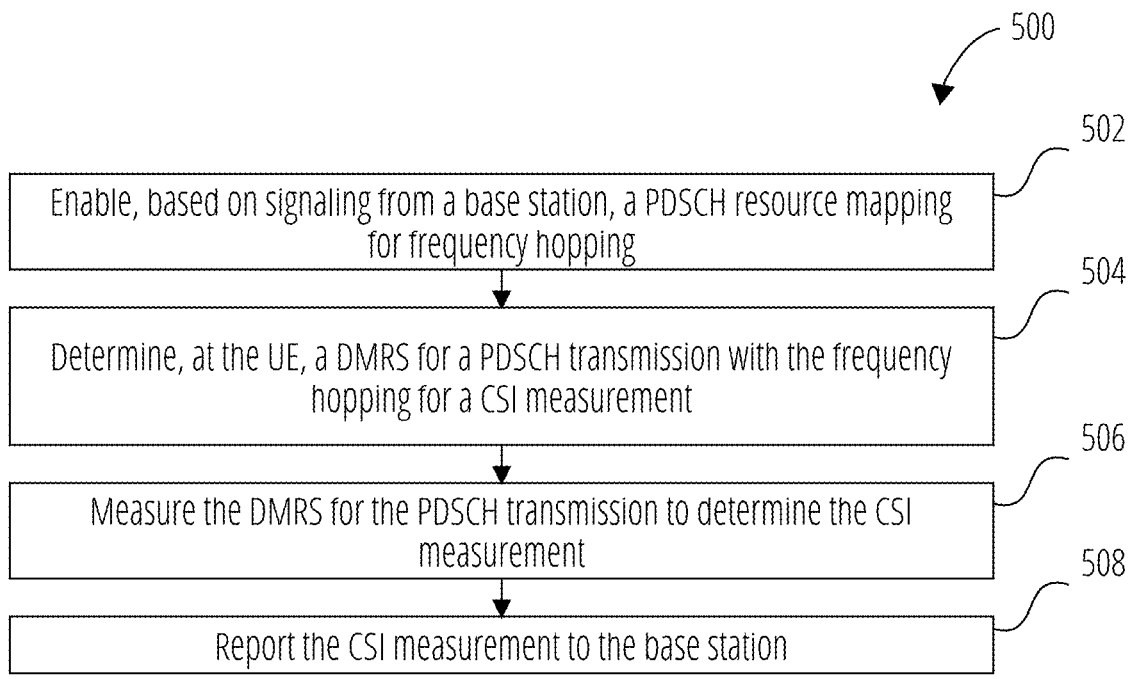
FIG. 5 is a flowchart of a method for a UE to perform CSI measurement based on measuring a DMRS for a PDSCH in accordance with one embodiment.

FIG. 5 is a flowchart of a method 500 for a UE to perform CSI measurement based on measuring a DMRS for a PDSCH transmission according to certain embodiments. In block 502, the method 500 includes enabling, based on signaling from a base station, a PDSCH resource mapping for frequency hopping. In block 504, the method 500 includes determining, at the UE, the DMRS for the PDSCH transmission with the frequency hopping for the CSI measurement. In block 506, the method 500 includes measuring the DMRS for the PDSCH transmission to determine the CSI measurement. In block 508, the method 500 includes reporting the CSI measurement to the base station.

In one embodiment, the method 500 further includes reporting, from the UE to the base station, a UE capability to support the CSI measurement based on measuring the DMRS for the PDSCH transmission.

In one embodiment of the method 500, the signaling from the base station comprises higher layer signaling comprising one or more of RRC signaling and DCI. The DCI may include a flag to indicate the frequency hopping. The higher layer signaling may configure a frequency offset for each hop of the frequency hopping. The frequency offset may be defined at a resource block level corresponding to either a first gap between starting resource blocks for every two hops or a second gap between an ending resource block in a first hop and a corresponding starting resource block in a second hop. In certain embodiments, the frequency offset for each hop is based on a reference hop. In certain embodiments, the RRC signaling comprises a list of frequency hopping offsets and a field in the DCI indicates one frequency hopping offset from the list.

In one embodiment, the method 500 further includes determining a frequency offset for each hop of the frequency hopping based on one or more of a number of scheduled resource blocks (N_RB), a maximum number of scheduled resource blocks in an active bandwidth part (N_BWP), and a total number of hops (N_h). For example, the frequency offset=N_RB+floor(N_BWP/N_h), wherein floor ( ) is a floor function.

In one embodiment of the method 500, the signaling from the base station comprises RRC signaling or a scheduling DCI indicating a number of hops for the frequency hopping for the PDSCH transmission.

In one embodiment of the method 500, a number of hops for the frequency hopping for the PDSCH transmission is predefined. In another embodiment, the number of hops for the frequency hopping for the PDSCH transmission is based on a number of PDSCH transmission occasions. The number of hops may be the same as the number of PDSCH transmission occasions. In certain embodiments, the signaling from the base station indicates a number of hops per the number of PDSCH transmission occasions, wherein a total number of hops comprises the number of PDSCH transmission occasions times the number of hops per the number of PDSCH transmission occasions.

In one embodiment, the method 500 further includes determining a maximum number of hops for the frequency hopping for the PDSCH transmission based on a number of scheduled resource blocks (N_RB) and a total number of resource blocks in an active bandwidth part (N_BWP). For example, the maximum number of hops=ceil(N_BWP/N_RB), where ceil( ) is a ceiling function.

In one embodiment of the method 500, the signaling from the base station indicates a DMRS time domain location per hop of the frequency hopping, the method further comprising applying a common DMRS time domain pattern for the frequency hopping.

In one embodiment of the method 500, the signaling from the base station indicates a DMRS time domain location per PDSCH transmission occasion, wherein each hop of the frequency hopping comprises DMRS symbols with a same number of DMRS ports.

In one embodiment of the method 500, the frequency hopping is applicable for a single type of FDRA or for two types of FDRA.

In one embodiment, the method 500 further includes using a consistent receive beam to receive the PDSCH transmission across multiple frequency hops.

In one embodiment, the method 500 further includes applying the frequency hopping for each actual PDSCH transmission occasion or nominal PDSCH transmission occasions based on scheduling.

In one embodiment, the method 500 further includes, in response to determining that a number of PDSCH transmission occasions is above a number of hops of the frequency hopping, applying a same hopping pattern across each corresponding PDSCH transmission occasion.

In one embodiment, the method 500 further includes: measuring, based on the signaling from the base station, a CSI reference signal (CSI-RS); and determining the CSI measurement to report to the base station based on both the CSI-RS and the DMRS for the PDSCH transmission.

Figure 6:
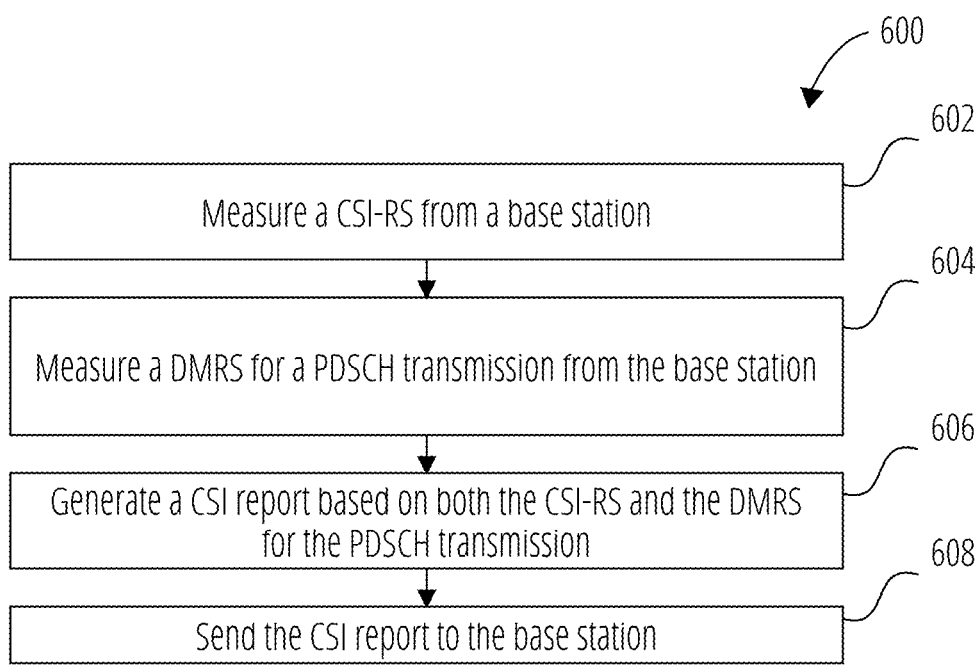
FIG. 6 is a flowchart of a method for a UE to report CSI in accordance with one embodiment.

FIG. 6 is a flowchart of a method 600 for a UE to report CSI according to certain embodiments. In block 602, the method 600 includes measuring a CSI-RS from a base station. In block 604, the method 600 includes measuring a DMRS for a PDSCH transmission from the base station. In block 606, the method 600 includes generating a CSI report based on both the CSI-RS and the DMRS for the PDSCH transmission. In block 608, the method 600 includes sending the CSI report to the base station.

In one embodiment of the method 600, measuring the DMRS for the PDSCH transmission comprises measuring the DMRS for the PDSCH transmission using frequency hopping (e.g., using the method 500 discussed with respect to FIG. 5).

In one embodiment of the method 600, measuring the CSI-RS and the DMRS for the PDSCH transmission is triggered by a single downlink control information (DCI) from the base station, and the single DCI comprises a CSI request field.

In one embodiment of the method 600, measuring the CSI-RS is triggered by a first downlink control information (DCI) from the base station and measuring the DMRS for the PDSCH transmission is triggered by a second DCI from the base station. For example, a single bit in the second DCI may indicate the PDSCH transmission is used for CSI measurement. In another embodiment, a preparation delay for the CSI report indicates the PDSCH transmission is used for CSI measurement.

In one embodiment, the method 600 includes using the CSI-RS for a channel measurement and using the DMRS for the PDSCH transmission for an interference measurement. In one such embodiment, the method 600 may further include: receiving, from the base station, an indication of whether a time domain measurement restriction (TDMR) for the PDSCH is enabled or not; if the TDMR is enabled, performing the interference measurement based on a latest PDSCH instance that satisfies a predetermined processing delay; and if the TDMR is not enabled, performing the interference measurement based on one or more PDSCH instances that satisfy the predetermined processing delay after interference averaging.

Embodiments contemplated herein include an apparatus comprising means to perform one or more elements of the method 500 and/or the method 600. This apparatus may be, for example, an apparatus of a UE (such as a wireless device 802 that is a UE, as described herein).

Embodiments contemplated herein include one or more non-transitory computer-readable media comprising instructions to cause an electronic device, upon execution of the instructions by one or more processors of the electronic device, to perform one or more elements of the method 500 and/or the method 600. This non-transitory computer-readable media may be, for example, a memory of a UE (such as a memory 806 of a wireless device 802 that is a UE, as described herein).

Embodiments contemplated herein include an apparatus comprising logic, modules, or circuitry to perform one or more elements of the method 500 and/or the method 600. This apparatus may be, for example, an apparatus of a UE (such as a wireless device 802 that is a UE, as described herein).

Embodiments contemplated herein include an apparatus comprising: one or more processors and one or more computer-readable media comprising instructions that, when executed by the one or more processors, cause the one or more processors to perform one or more elements of the method 500 and/or the method 600. This apparatus may be, for example, an apparatus of a UE (such as a wireless device 802 that is a UE, as described herein).

Embodiments contemplated herein include a signal as described in or related to one or more elements of the method 500 and/or the method 600.

Embodiments contemplated herein include a computer program or computer program product comprising instructions, wherein execution of the program by a processor is to cause the processor to carry out one or more elements of the method 500 and/or the method 600. The processor may be a processor of a UE (such as a processor(s) 804 of a wireless device 802 that is a UE, as described herein). These instructions may be, for example, located in the processor and/or on a memory of the UE (such as a memory 806 of a wireless device 802 that is a UE, as described herein).

Figure 7:
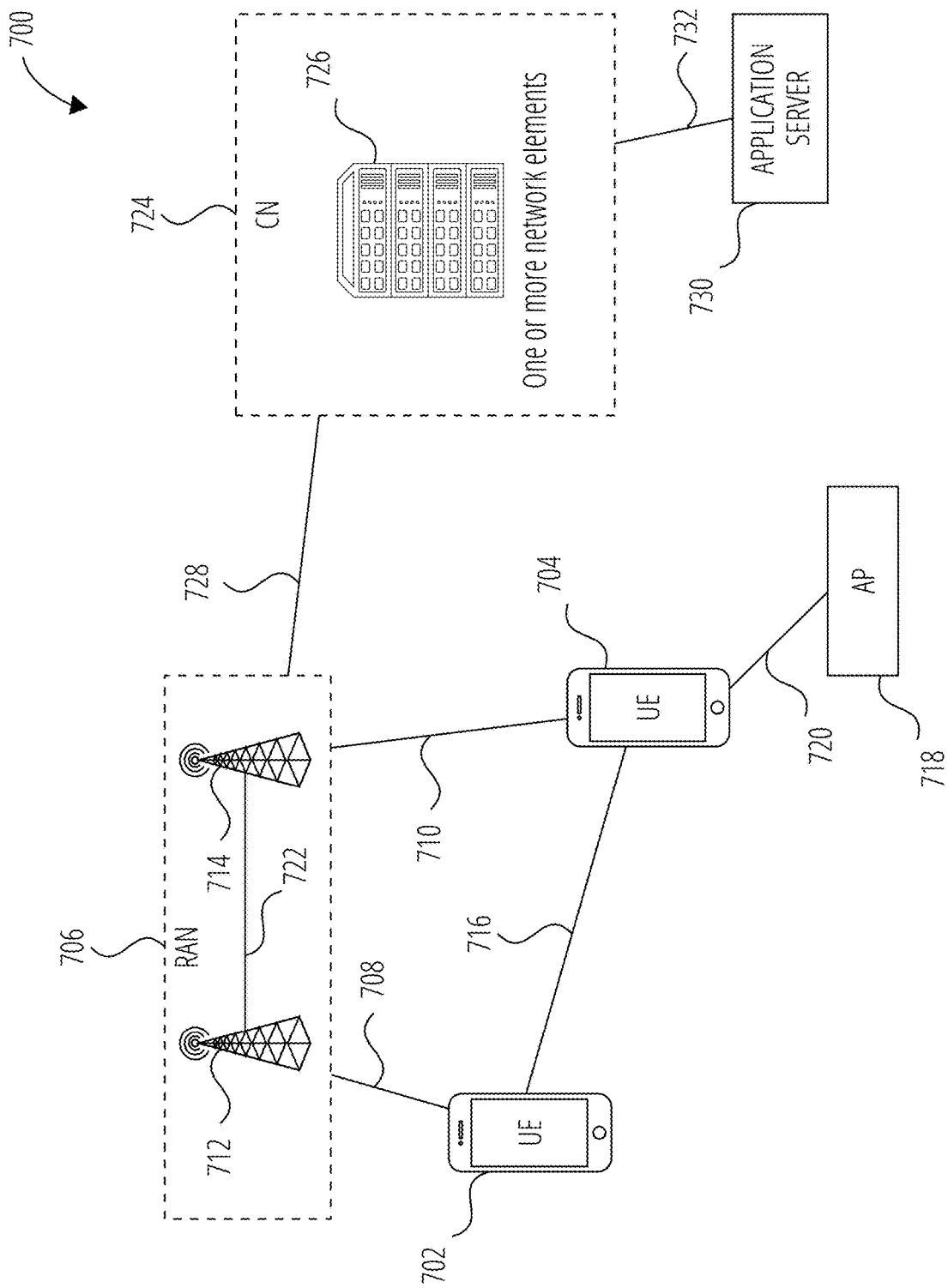
FIG. 7 illustrates an example architecture of a wireless communication system, according to embodiments disclosed herein.

FIG. 7 illustrates an example architecture of a wireless communication system 700, according to embodiments disclosed herein. The following description is provided for an example wireless communication system 700 that operates in conjunction with the LTE system standards and/or 5G or NR system standards as provided by 3GPP technical specifications.

As shown by FIG. 7, the wireless communication system 700 includes UE 702 and UE 704 (although any number of UEs may be used). In this example, the UE 702 and the UE 704 are illustrated as smartphones (e.g., handheld touchscreen mobile computing devices connectable to one or more cellular networks), but may also comprise any mobile or non-mobile computing device configured for wireless communication.

The UE 702 and UE 704 may be configured to communicatively couple with a RAN 706. In embodiments, the RAN 706 may be NG-RAN, E-UTRAN, etc. The UE 702 and UE 704 utilize connections (or channels) (shown as connection 708 and connection 710, respectively) with the RAN 706, each of which comprises a physical communications interface. The RAN 706 can include one or more base stations, such as base station 712 and base station 714, that enable the connection 708 and connection 710.

In this example, the connection 708 and connection 710 are air interfaces to enable such communicative coupling, and may be consistent with RAT(s) used by the RAN 706, such as, for example, an LTE and/or NR.

In some embodiments, the UE 702 and UE 704 may also directly exchange communication data via a sidelink interface 716. The UE 704 is shown to be configured to access an access point (shown as AP 718) via connection 720. By way of example, the connection 720 can comprise a local wireless connection, such as a connection consistent with any IEEE 602.11 protocol, wherein the AP 718 may comprise a Wi-Fi® router. In this example, the AP 718 may be connected to another network (for example, the Internet) without going through a CN 724.

In embodiments, the UE 702 and UE 704 can be configured to communicate using orthogonal frequency division multiplexing (OFDM) communication signals with each other or with the base station 712 and/or the base station 714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 712 or base station 714 may be implemented as one or more software entities running on server computers as part of a virtual network. In addition, or in other embodiments, the base station 712 or base station 714 may be configured to communicate with one another via interface 722. In embodiments where the wireless communication system 700 is an LTE system (e.g., when the CN 724 is an EPC), the interface 722 may be an X2 interface. The X2 interface may be defined between two or more base stations (e.g., two or more eNBs and the like) that connect to an EPC, and/or between two eNBs connecting to the EPC. In embodiments where the wireless communication system 700 is an NR system (e.g., when CN 724 is a 5GC), the interface 722 may be an Xn interface. The Xn interface is defined between two or more base stations (e.g., two or more gNBs and the like) that connect to 5GC, between a base station 712 (e.g., a gNB) connecting to 5GC and an eNB, and/or between two eNBs connecting to 5GC (e.g., CN 724).

The RAN 706 is shown to be communicatively coupled to the CN 724. The CN 724 may comprise one or more network elements 726, which are configured to offer various data and telecommunications services to customers/subscribers (e.g., users of UE 702 and UE 704) who are connected to the CN 724 via the RAN 706. The components of the CN 724 may be implemented in one physical device or separate physical devices including components to read and execute instructions from a machine-readable or computer-readable medium (e.g., a non-transitory machine-readable storage medium).

In embodiments, the CN 724 may be an EPC, and the RAN 706 may be connected with the CN 724 via an S1 interface 728. In embodiments, the S1 interface 728 may be split into two parts, an S1 user plane (S1-U) interface, which carries traffic data between the base station 712 or base station 714 and a serving gateway (S-GW), and the S1-MME interface, which is a signaling interface between the base station 712 or base station 714 and mobility management entities (MMEs).

In embodiments, the CN 724 may be a 5GC, and the RAN 706 may be connected with the CN 724 via an NG interface 728. In embodiments, the NG interface 728 may be split into two parts, an NG user plane (NG-U) interface, which carries traffic data between the base station 712 or base station 714 and a user plane function (UPF), and the S1 control plane (NG-C) interface, which is a signaling interface between the base station 712 or base station 714 and access and mobility management functions (AMFs).

Generally, an application server 730 may be an element offering applications that use internet protocol (IP) bearer resources with the CN 724 (e.g., packet switched data services). The application server 730 can also be configured to support one or more communication services (e.g., VoIP sessions, group communication sessions, etc.) for the UE 702 and UE 704 via the CN 724. The application server 730 may communicate with the CN 724 through an IP communications interface 732.

Figure 8:
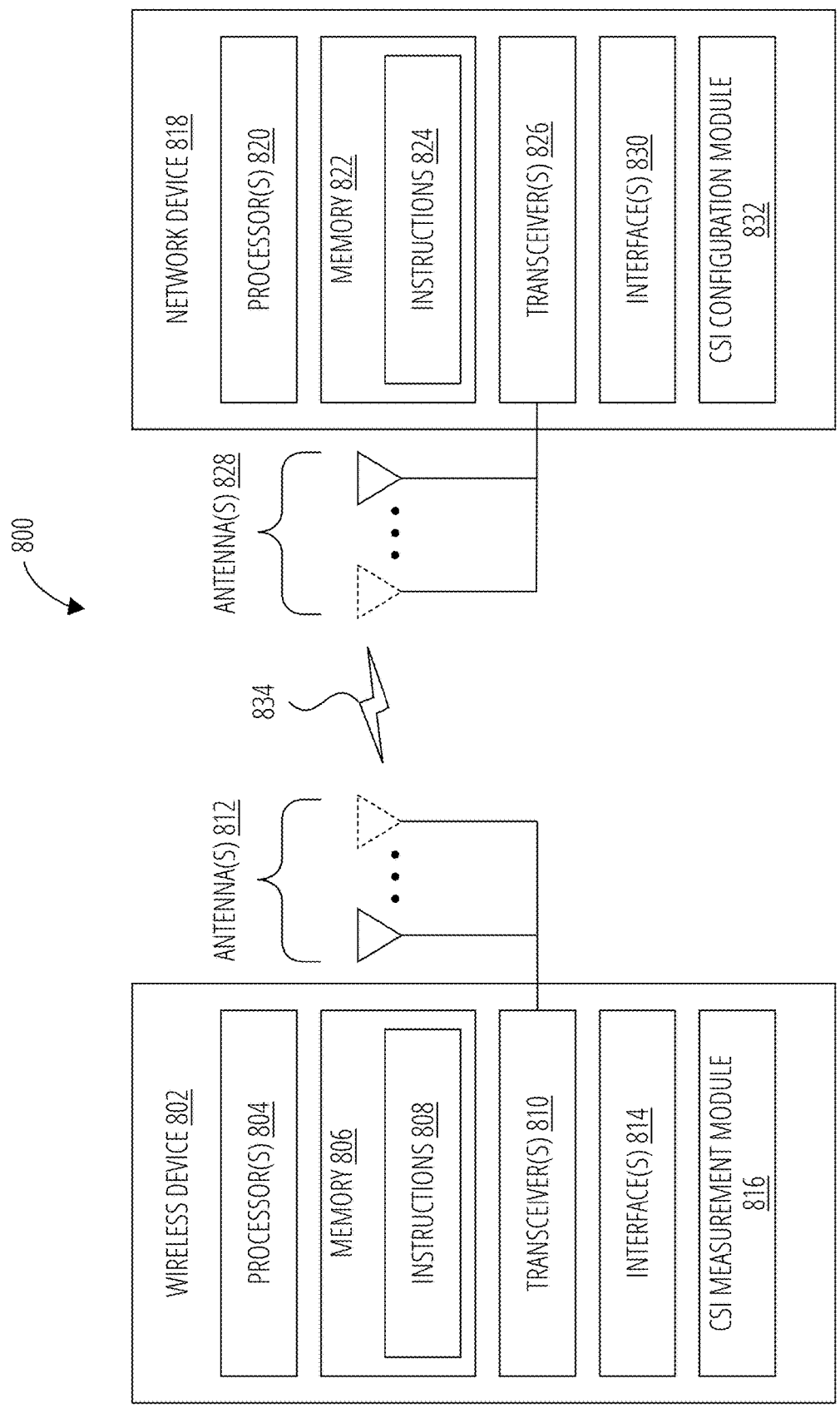
FIG. 8 illustrates a system for performing signaling between a wireless device and a network device, according to embodiments disclosed herein.

FIG. 8 illustrates a system 800 for performing signaling 834 between a wireless device 802 and a network device 818, according to embodiments disclosed herein. The system 800 may be a portion of a wireless communications system as herein described. The wireless device 802 may be, for example, a UE of a wireless communication system. The network device 818 may be, for example, a base station (e.g., an eNB or a gNB) of a wireless communication system.

The wireless device 802 may include one or more processor(s) 804. The processor(s) 804 may execute instructions such that various operations of the wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The wireless device 802 may include one or more transceiver(s) 810 that may include radio frequency (RF) transmitter and/or receiver circuitry that use the antenna(s) 812 of the wireless device 802 to facilitate signaling (e.g., the signaling 834) to and/or from the wireless device 802 with other devices (e.g., the network device 818) according to corresponding RATs.

The wireless device 802 may include one or more antenna(s) 812 (e.g., one, two, four, or more). For embodiments with multiple antenna(s) 812, the wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 802 may be accomplished according to precoding (or digital beamforming) that is applied at the wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The wireless device 802 may include one or more interface(s) 814. The interface(s) 814 may be used to provide input to or output from the wireless device 802. For example, a wireless device 802 that is a UE may include interface(s) 814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The wireless device 802 may include a CSI measurement module 816. The CSI measurement module 816 may be implemented via hardware, software, or combinations thereof. For example, the CSI measurement module 816 may be implemented as a processor, circuit, and/or instructions 808 stored in the memory 806 and executed by the processor(s) 804. In some examples, the CSI measurement module 816 may be integrated within the processor(s) 804 and/or the transceiver(s) 810. For example, the CSI measurement module 816 may be implemented by a combination of software components (e.g., executed by a DSP or a general processor) and hardware components (e.g., logic gates and circuitry) within the processor(s) 804 or the transceiver(s) 810.

The CSI measurement module 816 may be used for various aspects of the present disclosure, for example, aspects of FIG. 2 to FIG. 6.

The network device 818 may include one or more processor(s) 820. The processor(s) 820 may execute instructions such that various operations of the network device 818 are performed, as described herein. The processor(s) 820 may include one or more baseband processors implemented using, for example, a CPU, a DSP, an ASIC, a controller, an FPGA device, another hardware device, a firmware device, or any combination thereof configured to perform the operations described herein.

The network device 818 may include a memory 822. The memory 822 may be a non-transitory computer-readable storage medium that stores instructions 824 (which may include, for example, the instructions being executed by the processor(s) 820). The instructions 824 may also be referred to as program code or a computer program. The memory 822 may also store data used by, and results computed by, the processor(s) 820.

The network device 818 may include one or more transceiver(s) 826 that may include RF transmitter and/or receiver circuitry that use the antenna(s) 828 of the network device 818 to facilitate signaling (e.g., the signaling 834) to and/or from the network device 818 with other devices (e.g., the wireless device 802) according to corresponding RATs.

The network device 818 may include one or more antenna(s) 828 (e.g., one, two, four, or more). In embodiments having multiple antenna(s) 828, the network device 818 may perform MIMO, digital beamforming, analog beamforming, beam steering, etc., as has been described.

The network device 818 may include one or more interface(s) 830. The interface(s) 830 may be used to provide input to or output from the network device 818. For example, a network device 818 that is a base station may include interface(s) 830 made up of transmitters, receivers, and other circuitry (e.g., other than the transceiver(s) 826/antenna(s) 828 already described) that enables the base station to communicate with other equipment in a core network, and/or that enables the base station to communicate with external networks, computers, databases, and the like for purposes of operations, administration, and maintenance of the base station or other equipment operably connected thereto.

The network device 818 may include a CSI configuration module 832. The CSI configuration module 832 may be implemented via hardware, software, or combinations thereof. For example, the CSI configuration module 832 may be implemented as a processor, circuit, and/or instructions 824 stored in the memory 822 and executed by the processor(s) 820. In some examples, the CSI configuration module 832 may be integrated within the processor(s) 820 and/or the transceiver(s) 826. For example, the CSI configuration module 832 may be implemented by a combination of software components (e.g., executed by a DSP or a general processor) and hardware components (e.g., logic gates and circuitry) within the processor(s) 820 or the transceiver(s) 826.

The CSI configuration module 832 may be used for various aspects of the present disclosure, as described herein for a base station.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to report a channel state information (CSI) measurement, the method comprising:
    triggering measuring of a CSI reference signal (CSI-RS) from a base station;
    triggering measuring of a demodulation reference signal (DMRS) for a physical downlink shared channel (PDSCH) transmission from the base station;
    generating a CSI report to report the CSI measurement based on both the CSI-RS and the DMRS for the PDSCH transmission; and
    sending the CSI report to report the CSI measurement to the base station.

2. The method of claim 1, wherein measuring the DMRS for the PDSCH transmission comprises measuring the DMRS for the PDSCH transmission using frequency hopping.

3. The method of claim 1, wherein measuring the CSI-RS and the DMRS for the PDSCH transmission is triggered by a single downlink control information (DCI) from the base station, and wherein the single DCI comprises a CSI request field.

4. The method of claim 1, wherein measuring the CSI-RS is triggered by a first downlink control information (DCI) from the base station and measuring the DMRS for the PDSCH transmission is triggered by a second DCI from the base station.

5. The method of claim 4, wherein a single bit in the second DCI indicates the PDSCH transmission is used for the CSI measurement.

6. The method of claim 4, wherein a preparation delay for the CSI report indicates the PDSCH transmission is used for the CSI measurement.

7. The method of claim 1, further comprising using the CSI-RS for a channel measurement and using the DMRS for the PDSCH transmission for an interference measurement.

8. The method of claim 7, further comprising:
    receiving, from the base station, an indication of whether a time domain measurement restriction (TDMR) for the PDSCH transmission is enabled or not;

if the TDMR is enabled, performing the interference measurement based on a latest PDSCH instance that satisfies a predetermined processing delay; and if the TDMR is not enabled, performing the interference measurement based on one or more PDSCH instances that satisfy the predetermined processing delay after interference averaging.

9. An apparatus for a user equipment (UE) to report a channel state information (CSI) measurement, comprising:

a memory to store a CSI reference signal (CSI-RS) from a base station; and one or more processors configured to cause the UE to:

trigger measuring of a demodulation reference signal (DMRS) for a physical downlink shared channel (PDSCH) transmission from the base station;

generate a CSI report to report the CSI measurement based on both the CSI-RS and the DMRS for the PDSCH transmission; and send the CSI report to report the CSI measurement to the base station.

10. The apparatus of claim 9, wherein measuring the DMRS for the PDSCH transmission comprises measuring the DMRS for the PDSCH transmission using frequency hopping.

11. The apparatus of claim 9, wherein measuring the CSI-RS and the DMRS for the PDSCH transmission is triggered by a single downlink control information (DCI) from the base station, and wherein the single DCI comprises a CSI request field.

12. The apparatus of claim 9, wherein measuring the CSI-RS is triggered by a first downlink control information (DCI) from the base station and measuring the DMRS for the PDSCH transmission is triggered by a second DCI from the base station.

13. The apparatus of claim 12, wherein a single bit in the second DCI indicates the PDSCH transmission is used for the CSI measurement.

14. The apparatus of claim 12, wherein a preparation delay for the CSI report indicates the PDSCH transmission is used for the CSI measurement.

15. The apparatus of claim 9, wherein the one or more processors are further configured to use the CSI-RS for a channel measurement and using the DMRS for the PDSCH transmission for an interference measurement.

16. The apparatus of claim 15, wherein the one or more processors are further configured to:

receive, from the base station, an indication of whether a time domain measurement restriction (TDMR) for the PDSCH transmission is enabled or not;

if the TDMR is enabled, perform the interference measurement based on a latest PDSCH instance that satisfies a predetermined processing delay; and if the TDMR is not enabled, perform the interference measurement based on one or more PDSCH instances that satisfy the predetermined processing delay after interference averaging.

17. A non-transitory computer-readable storage medium including instructions that, when executed by one or more processors of a user equipment (UE) configured to report a channel state information (CSI) measurement, cause the UE to:

trigger measuring of a CSI reference signal (CSI-RS) from a base station;

trigger measuring of a demodulation reference signal (DMRS) for a physical downlink shared channel (PDSCH) transmission from the base station;

generate a CSI report to report the CSI measurement based on both the CSI-RS and the DMRS for the PDSCH transmission; and send the CSI report to report the CSI measurement to the base station.

18. The non-transitory computer-readable storage medium of claim 17, wherein measuring the DMRS for the PDSCH transmission comprises measuring the DMRS for the PDSCH transmission using frequency hopping.

19. The non-transitory computer-readable storage medium of claim 17, wherein measuring the CSI-RS and the DMRS for the PDSCH transmission is triggered by a single downlink control information (DCI) from the base station, and wherein the single DCI comprises a CSI request field.

20. The non-transitory computer-readable storage medium of claim 17, wherein measuring the CSI-RS is triggered by a first downlink control information (DCI) from the base station and measuring the DMRS for the PDSCH transmission is triggered by a second DCI from the base station.

* * * * *